(12) United States Patent
Fujii et al.

(10) Patent No.: US 11,075,564 B2
(45) Date of Patent: Jul. 27, 2021

(54) POWER TOOL

(71) Applicant: MAKITA CORPORATION, Anjo (JP)

(72) Inventors: Fuminari Fujii, Anjo (JP); Ryosuke Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 21 days.

(21) Appl. No.: 16/739,190

(22) Filed: Jan. 10, 2020

(65) Prior Publication Data

US 2020/0266679 A1 Aug. 20, 2020

(30) Foreign Application Priority Data

Feb. 14, 2019 (JP) .............................. JP2019-024755

(51) Int. Cl.
*H01R 39/38* (2006.01)
*H02K 5/14* (2006.01)
*H02K 7/14* (2006.01)
*B24B 23/02* (2006.01)

(52) U.S. Cl.
CPC ........... *H02K 5/148* (2013.01); *B24B 23/028* (2013.01); *H01R 39/381* (2013.01); *H01R 39/385* (2013.01); *H02K 7/145* (2013.01)

(58) Field of Classification Search
CPC ...... H02K 5/148; H02K 7/145; H01R 39/385; H01R 39/38
See application file for complete search history.

(56) References Cited

U.S. PATENT DOCUMENTS

| 2,763,800 | A | * | 9/1956 | Curley | H02K 5/148 310/239 |
| 4,847,528 | A | * | 7/1989 | Eguchi | B29C 70/84 310/239 |
| 4,897,571 | A | * | 1/1990 | Isozumi | F02N 11/00 310/239 |
| 7,942,247 | B2 | * | 5/2011 | Adachi | F16D 65/18 188/72.6 |
| 8,373,327 | B2 | * | 2/2013 | Yoshikawa | H02K 5/1732 310/239 |

FOREIGN PATENT DOCUMENTS

JP 2011-230211 A 11/2011

* cited by examiner

*Primary Examiner* — Dang D Le

(74) *Attorney, Agent, or Firm* — Oliff PLC

(57) ABSTRACT

A power tool includes a brush holder with a brush positioned more accurately with respect to a commutator. A grinder as a power tool includes a housing, a stator fixed to the housing, a rotor rotatable relative to the stator and including a commutator and a coil, a brush that comes in contact with the commutator, a brush-holding metal plate having a screw hole and holding the brush, and a screw extending through the screw hole and directly fastened to the housing.

22 Claims, 7 Drawing Sheets

POWER TOOL

CROSS-REFERENCE TO RELATED APPLICATIONS

This application claims the benefit of priority to Japanese Patent Application No. 2019-024755, filed on Feb. 14, 2019, the entire contents of which are hereby incorporated by reference.

BACKGROUND

1. Technical Field

The present invention relates to a power tool such as a grinder.

2. Description of the Background

A known brush holder described in Japanese Unexamined Patent Application Publication No. 2011-230211 holds a brush that comes in contact with a commutator included in a brushed motor.

A brush holder 1 includes a brush housing 10, which is a metal sheet bent into a box, and a metal sheet base attached to the brush housing 10. The base includes a spring support 2, which is bent to support a spiral spring 20, and a brush-holder fixing plate 50, which is also bent. The brush holder 1 is fastened to a rear housing 62 in an electric disc grinder with a single screw 52, which extends through a hole 51 in the brush-holder fixing plate 50.

BRIEF SUMMARY

The known brush holder 1 includes the brush housing 10 and the base as separate parts. The brush housing 10 and the base can accumulate tolerances between them and can rattle. The brush is thus to be positioned more accurately with respect to the commutator.

One or more aspects of the present invention are directed to a power tool including a brush holder with a brush positioned more accurately with respect to a commutator.

A first aspect of the present invention provides a power tool, including:
a housing;
a stator fixed to the housing;
a rotor rotatable relative to the stator, the rotor including a commutator and a coil;
a brush configured to come in contact with the commutator;
a brush-holding metal plate having a screw hole and holding the brush; and
a screw extending through the screw hole and directly or indirectly fastened to the housing.

A second aspect of the present invention provides a power tool, including:
a housing;
a stator fixed to the housing;
a rotor rotatable relative to the stator, the rotor including a commutator and a coil;
a brush configured to come in contact with the commutator;
an elastic member configured to urge the brush toward the commutator; and
a brush-holding metal plate holding the brush and the elastic member.

A third aspect of the present invention provides a power tool, including:
a housing directly or indirectly including a housing projection;
a stator fixed to the housing;
a rotor rotatable relative to the stator, the rotor including a commutator and a coil;
a brush configured to come in contact with the commutator; and
a brush-holding metal plate having a plate hole and holding the brush,
wherein the housing projection is received in the plate hole.

A fourth aspect of the present invention provides a power tool, including:
a housing directly or indirectly including a housing hole;
a stator fixed to the housing;
a rotor rotatable relative to the stator, the rotor including a commutator and a coil;
a brush configured to come in contact with the commutator; and
a brush-holding metal plate including a plate projection and holding the brush,
wherein the plate projection is received in the housing hole.

The power tool according to the above aspects of the present invention includes the brush holder with the brush positioned more accurately with respect to the commutator.

DETAILED DESCRIPTION

Embodiments and modifications of the present invention will now be described with reference to the drawings.

Figure 1:
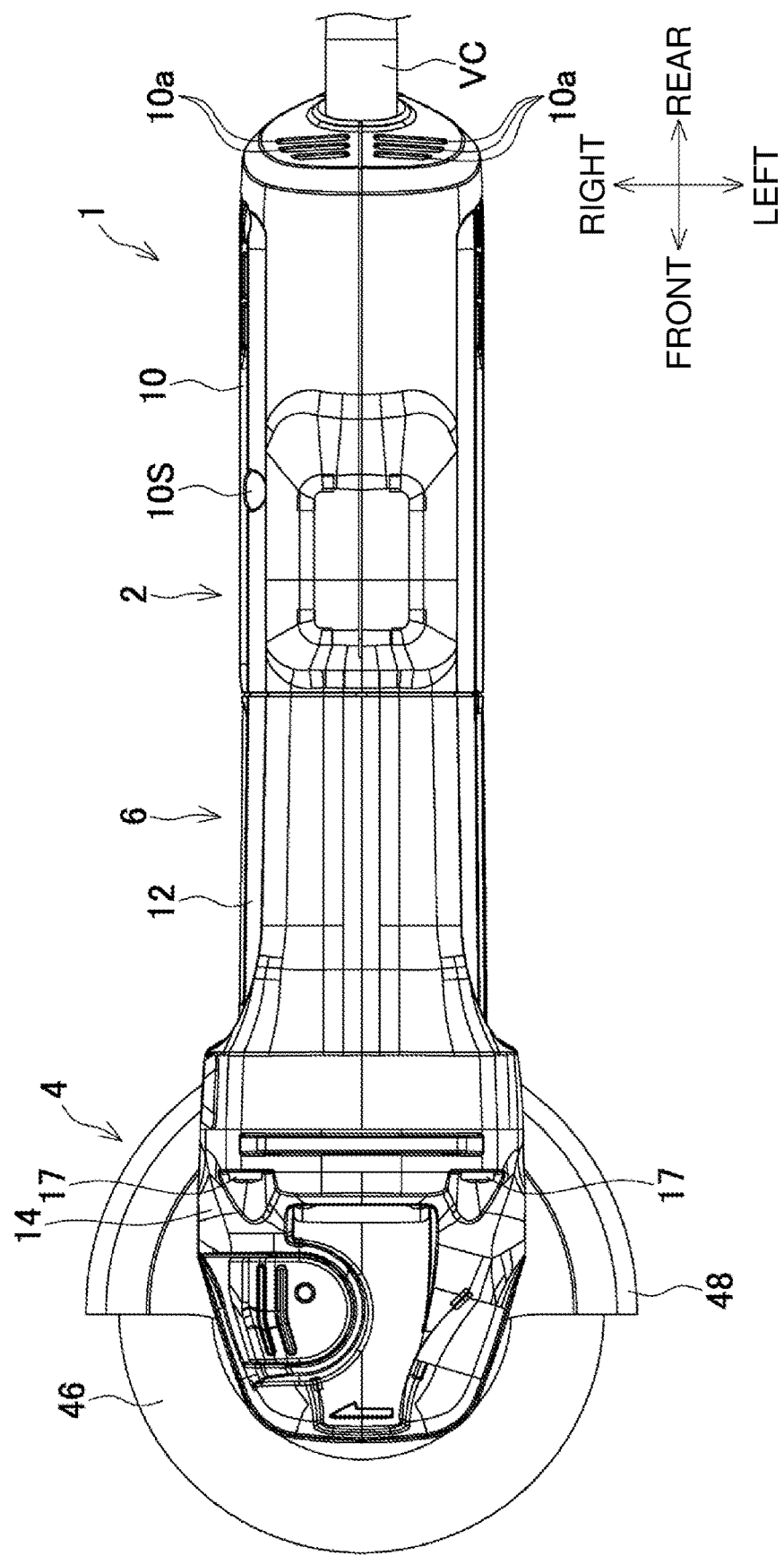
FIG. 1 is a top view of a grinder.
Figure 2:
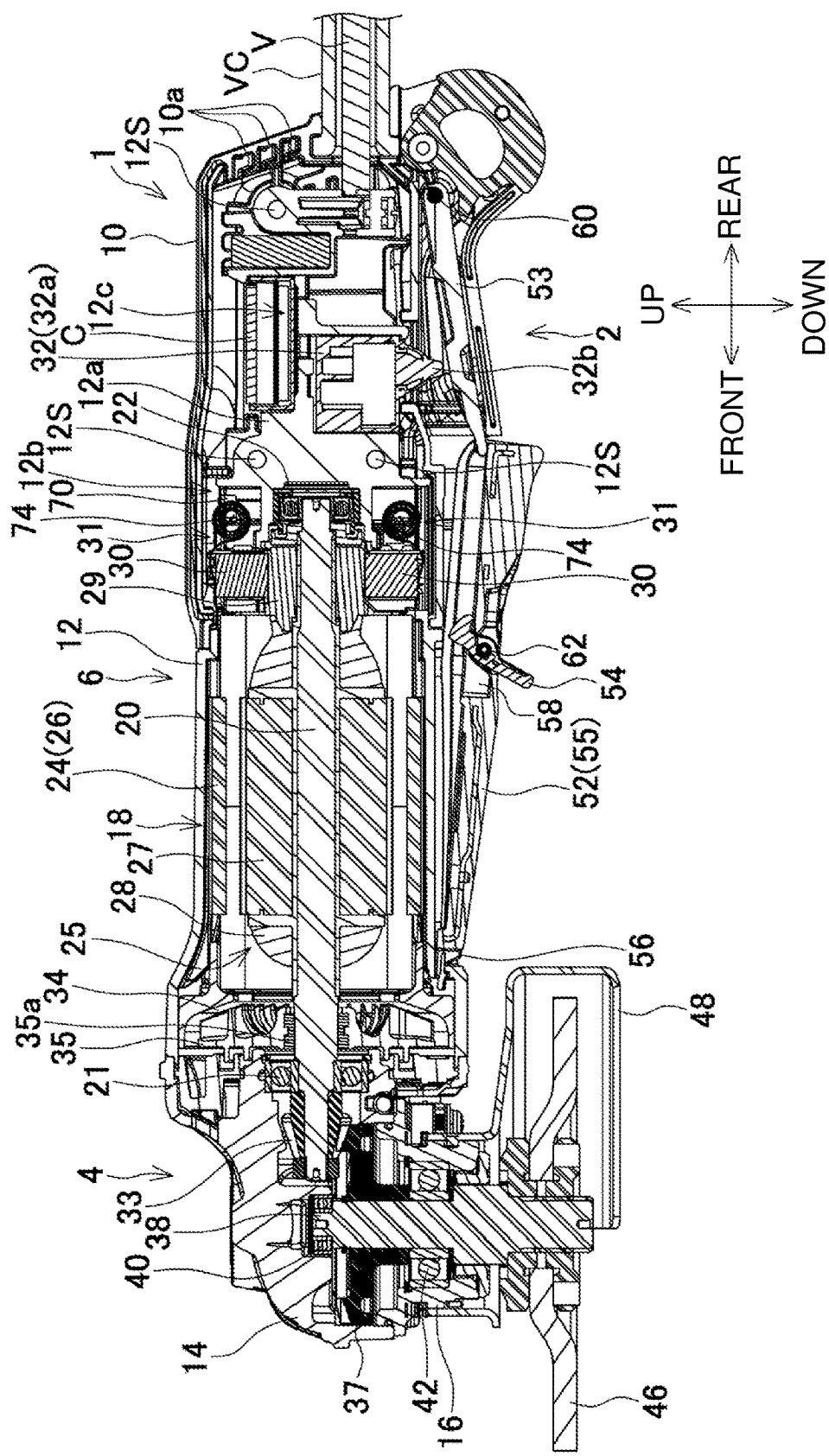
FIG. 2 is a longitudinal central sectional view of the grinder.
Figure 3:
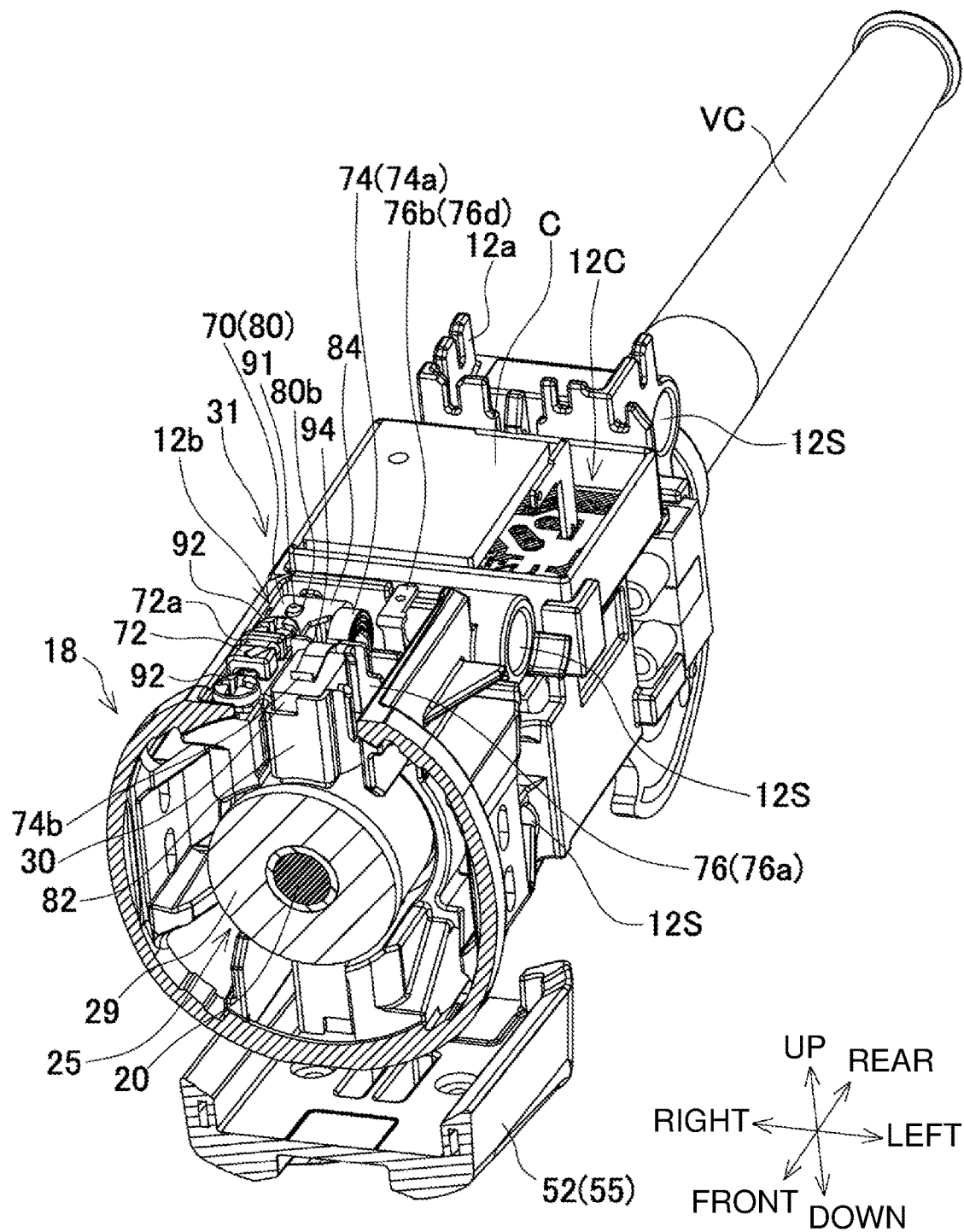
FIG. 3 is a perspective view of the grinder showing its rear without a cover.
Figure 4:
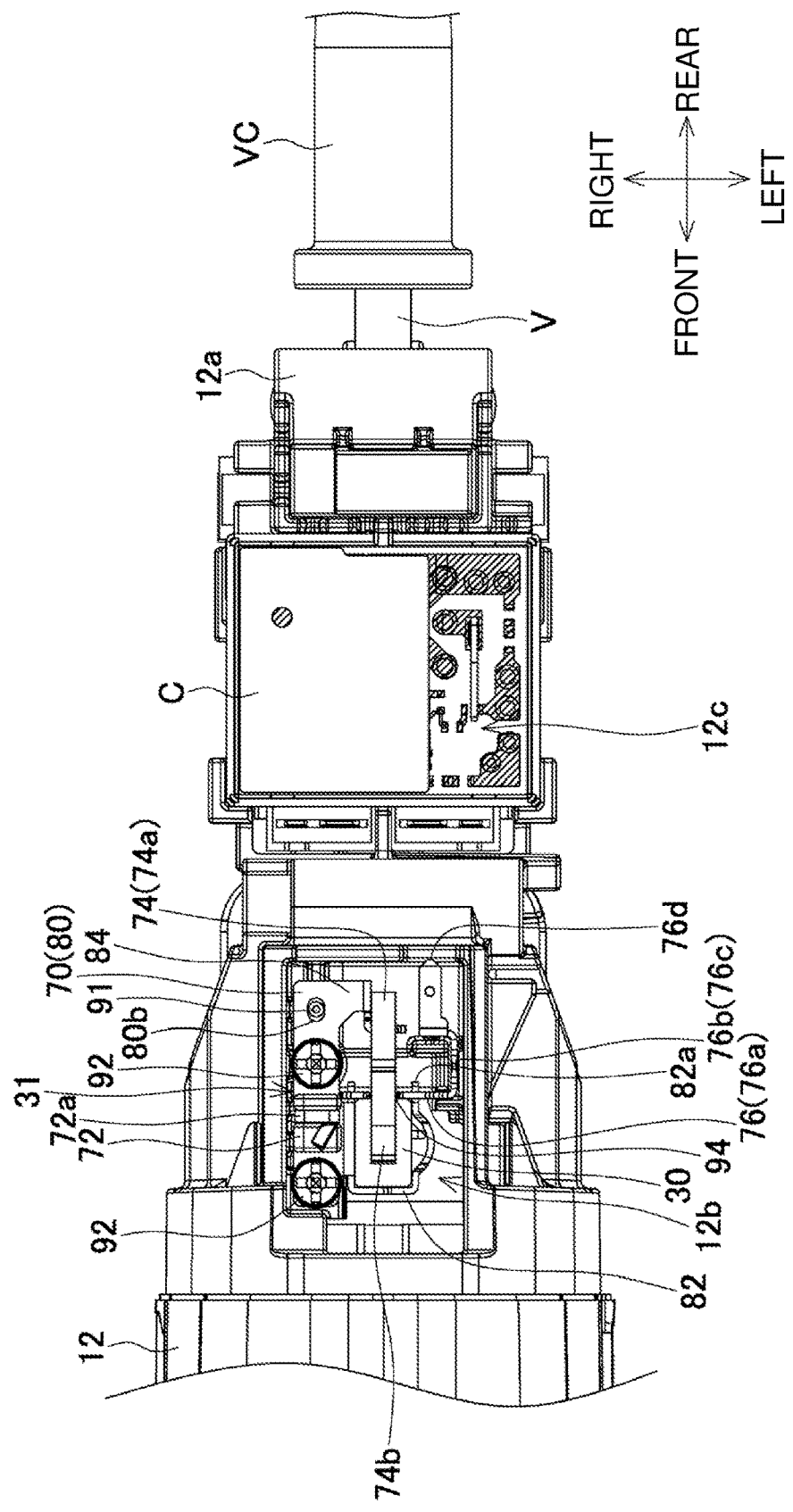
FIG. 4 is a top view of the grinder in FIG. 3.
Figure 5:
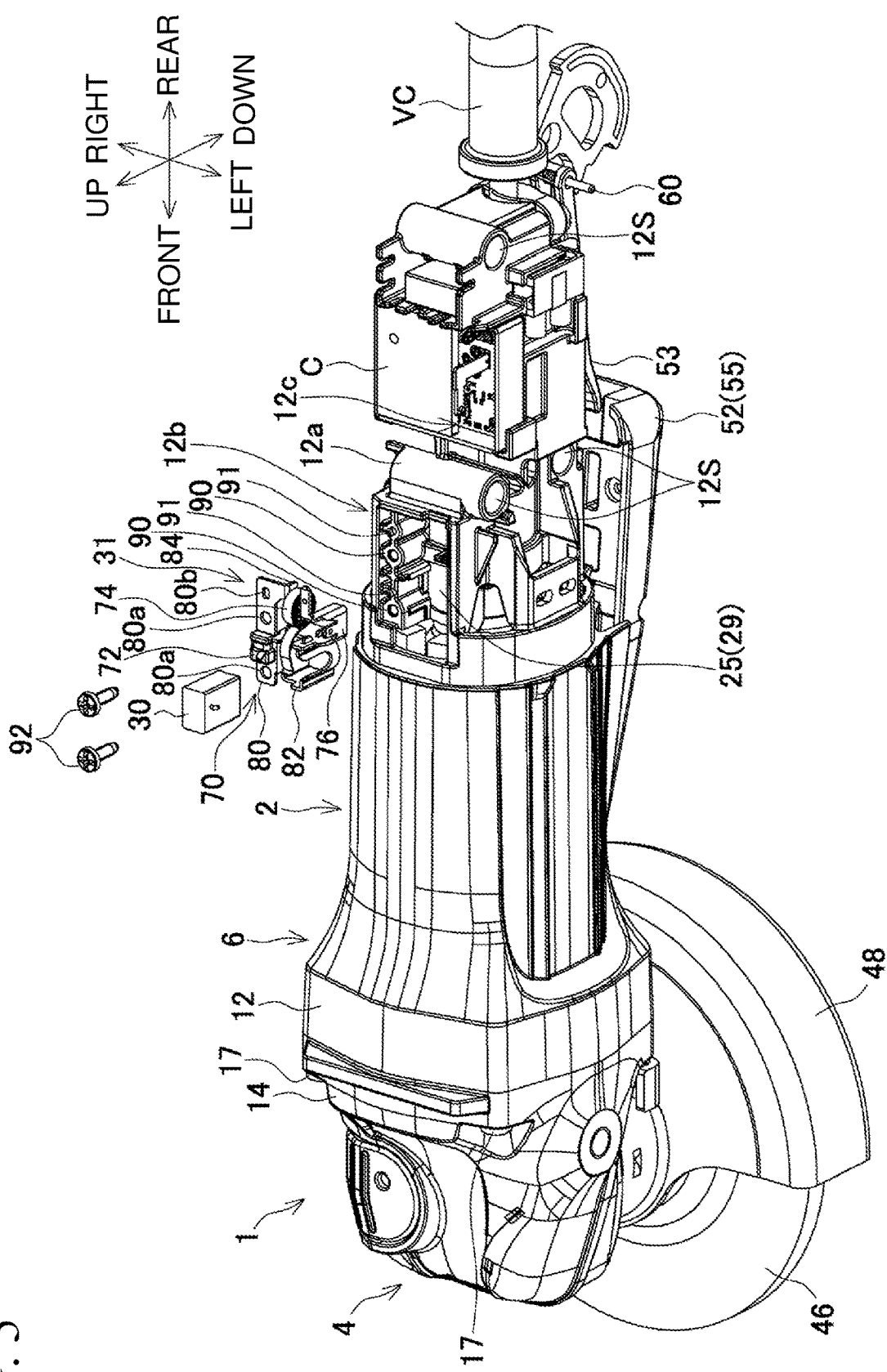
FIG. 5 is a partially exploded perspective view of the grinder.

FIG. 1 is a top view of a grinder 1 as an example of a power tool. FIG. 2 is a longitudinal central sectional view of the grinder 1. FIG. 3 is a perspective view of the grinder 1 showing its rear without a cover. FIG. 4 is a top view of the grinder 1 showing its rear without the cover. FIG. 5 is a partially exploded perspective view of the grinder 1.

In FIG. 1, the front of the grinder 1 is on the left, and the right side of the grinder 1 is at the top. In FIG. 2, the front of the grinder 1 is on the left, and the upper side of the grinder 1 is at the top. The orientations defined above can change relatively in accordance with any of the position of a workpiece, the operational situation, and movement of a relevant member or part.

The grinder 1 includes a body 2 and an output unit 4. The body 2 extends in the front-rear direction. The output unit 4 is located in front of the body 2.

The outer walls of the body 2 and the output unit 4 serve as a housing 6.

The housing 6 includes a rear cover 10 at its rear and a motor housing 12 in front of the rear cover 10. The rear cover 10 and the motor housing 12 serve as an outer wall of the body 2. The motor housing 12 has an extension 12a at its rear. The extension 12a has a smaller profile than the entire interior of the rear cover 10 and extends rearward. The extension 12a is accommodated in the rear cover 10. The housing 6 has an opening in its lower portion, or specifically, between a lower portion of the rear cover 10 and a lower portion of the motor housing 12. The extension 12a includes multiple (three) screw bosses 12S. The rear cover 10 has multiple (three) screw holes 10S, which correspond to the screw bosses 12S. The screw bosses 12S and the screw holes 10S receive screws (not shown) to fasten the rear cover 10 to the motor housing 12.

The housing 6 includes a gear housing 14 and a bearing retainer 16. The gear housing 14 is located in front of the motor housing 12. The bearing retainer 16 is fixed under the gear housing 14. The gear housing 14 and the bearing retainer 16 serve as an outer wall for the output unit 4. The gear housing 14 has a rear opening that receives a front opening of the motor housing 12. The gear housing 14 is fastened to the motor housing 12 with multiple (four) screws 17 extending in the front-rear direction.

The motor housing 12 holds an electric motor 18.

The motor 18 has a motor shaft 20 as a rotational shaft extending from inside the rear cover 10 into the gear housing 14 in the front-rear direction. The motor shaft 20 is rotatably supported by a motor front bearing 21 and a motor rear bearing 22. The motor front bearing 21 is held in the rear of the gear housing 14. The motor rear bearing 22 is held in the extension 12a on the motor housing 12.

The motor 18 includes a stator 24 and a rotor 25. The stator 24 is cylindrical and is fixed to the motor housing 12. The rotor 25 is located inward from the stator 24, and is rotatable relative to the stator 24.

The stator 24 includes a stator core 26 and a coil (not shown) wound around the stator core 26.

The rotor 25 includes the motor shaft 20, a rotor core 27 with multiple slot, and multiple coils 28. The rotor core 27 is fixed around the motor shaft 20. Each coil 28 is wound around a slot in the core 27.

A cylindrical commutator 29 is fixed between the coils 28 and the motor rear bearing 22 outward from a rear end of the motor shaft 20. The commutator 29 is divided into multiple conductive portions aligned circumferentially. The coils 28 are electrically connected to the conductive portions in a predetermined manner.

The commutator 29 comes in contact with cuboid carbon brushes 30 in its upper and lower portions. Each brush 30 is held in a corresponding brush holder 31. Each brush holder 31 is fixed to a corresponding brush holder fixing member 12b. The brush holder fixing members 12b are located in upper and lower portions of the extension 12a. The upper brush holder fixing member 12b is a box-like downward (in other words, inward) recess. The lower brush holder fixing member 12b is a box-like upward (in other words, inward) recess. The brush holders 31 are fixed in the manner described in detail later. Three or more brushes 30 and three or more brush holders 31 may be used. The brushes 30 and the brush holders 31 may be at any positions other than in the upper and lower portions. The brushes 30 may be formed from any material other than carbon.

A controller holder 12c is located on the extension 12a and behind the upper brush holder fixing member 12b. The controller holder 12c is a box-like downward recess. The controller holder 12c receives a controller C.

A switch body 32a in a switch 32 is fixed to a side surface of the extension 12a behind the motor shaft 20.

The switch 32 includes the switch body 32a and a plunger 32b. The plunger 32b protrudes downward from a lower surface of the switch body 32a. The plunger 32b is pressed upward by at least a predetermined pressing depth to turn on the switch.

The switch body 32a is electrically connected to an electric power cable V and the motor 18 (brushes 30) through the controller C. The electric power cable V extends rearward from the rear of the rear cover 10. Pressing the plunger 32b (switching operation unit) into the switch body 32a by a predetermined amount causes the electric power cable V to supply power to the motor 18.

An end of the electric power cable V adjacent to the rear cover 10 is covered with a power cable cover VC.

A pinion 33 having a bevel gear is located at a front end of the motor shaft 20. More specifically, the motor 18 includes, at its front, the pinion 33 that transmits a driving force to the output unit 4.

A baffle plate 34 and an axial-flow fan 35 are located between the pinion 33 and the coils 28. The baffle plate 34 includes a bottom with a hole at its rear, and flares frontward in a bowl shape. The fan 35 is located inside the baffle plate 34. The baffle plate 34 is fixed in the front opening of the motor housing 12. The fan 35 is fixed to the motor shaft 20 via a fan sleeve 35a. The fan 35 may be any other fan, such as a centrifugal fan. At least either the fan sleeve 35a or the baffle plate 34 may be eliminated.

The rear cover 10 has, in its rear surface, multiple air inlets 10a aligned vertically and laterally. Each air inlet 10a extends laterally. Any of the number of air inlets 10a, their size, shape, and arrangement may be modified from those described above.

The pinion 33 meshes with a bevel gear 37. The bevel gear 37 is fixed to a spindle 38.

The spindle 38 extends vertically to form an angle of substantially 90° with the motor shaft 20. More specifically, the spindle 38 (an output shaft of the output unit 4) forms an angle of substantially 90° with the motor shaft 20. The grinder 1 serves as an angle tool (angle power tool).

The spindle 38 has an upper portion received in the gear housing 14, a middle portion received in the bearing retainer 16, and a lower portion exposed from the bearing retainer 16.

The spindle 38 has an upper end received in a spindle upper bearing 40, which is fixed to the gear housing 14. The spindle 38 has the middle portion received in a spindle middle bearing 42, which is fixed to the bearing retainer 16.

The spindle 38 has a lower end receiving a grinding disc 46 (tip tool). A wheel cover 48 is attached to a lower portion of the bearing retainer 16. The wheel cover 48 flares to surround (a rear half of) the grinding disc 46.

The opening between the lower portion of the rear cover 10 and the lower portion of the motor housing 12 receives a paddle switch 50, which is an operable member. The paddle switch 50 serves as an operable outer wall for the body 2. The paddle switch 50 is used to turn on and off the switch 32 for the motor 18.

The paddle switch 50 includes a grip 52, an interlocking member 53, and a locking member 54.

The grip 52 includes a grip base 55, a fulcrum 56, and a locking opening 58. The grip base 55 extends in the front-rear direction and curves in the right-left direction into the shape of a rice ladle. The fulcrum 56 is located at the front end of the grip base 55. The locking opening 58 extends vertically through the rear of the grip base 55.

The fulcrum 56 is rotatably supported to the motor housing 12. The rotation axis extends in the right-left direction. The grip 52 is swingable (pivotable) about the fulcrum 56. The grip 52 is movable in the range of about 10°.

The grip 52 has a lower portion exposed through the opening in the lower portion of the housing 6.

The interlocking member 53 is in a plate shape extending in the front-rear and the right-left directions in a lower portion under the switch 32 in the rear cover 10. The interlocking member 53 receives a shaft 60 in a hole extending in the right-left direction through the rear end. The interlocking member 53 is swingable about the shaft 60.

The interlocking member 53 has a front end in contact with an upper rear end surface of the grip 52 (grip base 55).

An operator manually pivots the grip 52 upward from the position shown in FIG. 2 (lowermost position) about the fulcrum 56. The grip 52 pushes the interlocking member 53 to interlock the interlocking member 53 with the grip 52 to rotate together about the shaft 60. The interlocking member 53 then reaches the plunger 32b and presses the plunger 32b upward. The plunger 32b is pressed upward by at least the predetermined pressing depth to turn on the switch 32, which powers the motor 18.

When released by the operator, the grip 52 returns to the lowermost position under the urging force applied from an elastic member (not shown) extending vertically in the plunger 32b and also under gravity. This turns off the switch 32 to cut the power supply to the motor 18.

More specifically, the paddle switch 50 is vertically operable in the direction intersecting with (orthogonal to) the motor shaft 20. This operation turns on and off the switch 32 for the motor 18.

The locking member 54 is a rod member extending vertically to stand upright in a nonoperational state (FIG. 2). The locking member 54 is rotatably received in the locking opening 58 with a shaft 62 extending in the right-left direction. A torsion spring (not shown) is placed between the locking member 54 and the locking opening 58.

The locking member 54 protrudes vertically from the locking opening 58 in a nonoperational state. The locking member 54 has an upper end adjacent to an outer surface of the motor 18 to prevent the grip 52 from moving upward, thus preventing the switch 32 for the motor 18 from being turned on.

When an operator rotates a lower portion of the locking member 54 against the urging force applied from the torsion spring, the locking member 54 lies in the front-rear direction in the locking opening 58 to be parallel with the grip 52 (in a leaning state). In this state, the locking member 54 cannot prevent the grip 52 from moving upward. Thus, the grip 52 is movable upward. The operator holding the grip 52 further turns on the switch 32 for the motor 18 through the paddle switch 50.

The upper brush holder 31 and the upper brush holder fixing member 12b will now be described in more detail. The lower brush holder 31 and the lower brush holder fixing member 12b are the same as the upper brush holder 31 and the upper brush holder fixing member 12b.

As shown in FIGS. 6A to 6D, the brush holder 31 includes a brush-holding metal plate 70, a stopper (spacer) 72, a spiral spring 74, and a conductive metal plate 76. The brush-holding metal plate 70 holds the brush 30. The stopper 72 serves as a restrict member. The conductive metal plate 76 comes in contact with the brush 30.

Figure 6A:
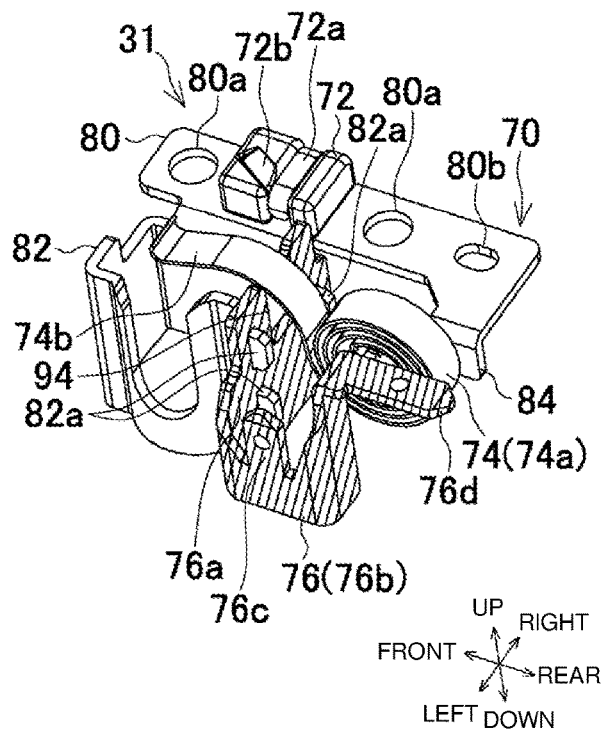
FIGS. 6A and 6B are perspective views of a brush holder in FIG. 5, and FIGS. 6C and 6D are perspective views of the brush holder and a brush in FIG. 5.
Figure 6B:
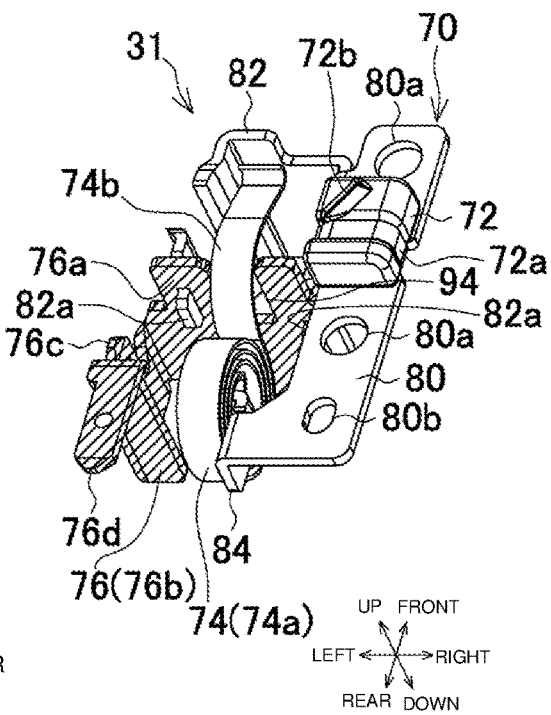

In FIGS. 6A and 6B, the conductive metal plate 76 is hatched to be easily distinguishable from the brush-holding metal plate 70.

The brush-holding metal plate 70 is formed by bending a single flat metal sheet. The brush-holding metal plate 70 includes a base 80, a case 82, and a spiral spring holder 84. The base 80 extends in the front-rear and right-left directions. The case 82 is a box located below and left of a front portion of the base 80, and open at its top, bottom, and rear. The spiral spring holder 84 protrudes leftward, downward, and frontward from a left rear portion of the base 80.

The base 80 has multiple (two) screw holes 80a and multiple (two) pin holes (plate holes) 80b aligned in the front-rear direction. The front pin hole 80b is unviewable in FIGS. 6A to 6D. The front pin hole 80b is located under a narrowed portion 72a (described later). The rear pin hole 80b is viewable in FIGS. 6A to 6D. The brush holder fixing member 12b includes multiple (two) screw bosses 90 and pins (housing projections) 91 aligned in the front-rear direction. The screw bosses 90 correspond to the screw holes 80a. Each pin 91 protrudes upward to be received in the corresponding (front or rear) pin hole 80b.

The case 82 accommodates and holds the brush 30.

Two screws 92 are screwed in two screw holes 80a and two screw bosses 90. At this time, the pin 91 is received in the corresponding pin hole 80b. Thus the brush-holding metal plate 70 is fastened to the brush holder fixing member 12b.

The stopper 72 is a block formed from a heat-resistant resin. The stopper 72 is located above one (a front one) of the screw holes 80b. In other words, the stopper 72 faces the pin 91. The stopper 72 is fixed to the base 80 and protrudes from an upper surface of the base 80. The stopper 72 has the narrowed portion 72a in its middle, which is narrower than other portions. More specifically, the narrowed portion 72a is lower than the stopper 72, and the narrowed portion 72a is narrower in left-right direction than the stopper 72.

The pin 91 has a height substantially the same as the thickness of the base 80 (or the depth of the pin hole 80b), and more specifically, slightly greater than the thickness of the base 80. The pin 91 is in contact with the stopper 72 (narrowed portion 72a) or is apart from the stopper 72.

The brushes 30 and the brush holders 31 generate heat while the motor 18 is operating (rotating). The stopper 72 is located between the rear cover 10 and the brush 30 in the brush holder 31. The stopper 72 thus restricts contact between the brush 30 in the brush holder 31 and the rear cover 10 to protect the rear cover 10 from heat.

The stopper 72 has a groove 72b on its upper front surface. The groove 72b is a downward recess shallower than the narrowed portion 72a to serve as a temporal engagement part for the spiral spring 74. The groove 72b extends from the right front to the left rear and is oblique to the front-rear direction. The groove 72b is deeper from its right side toward the left side.

The stopper 72 may have at least either another shape or another size. Two or more stoppers 72 may be provided, or no stopper 72 may be provided. In particular, the groove 72b may be replaced with or combined with a rib standing upward as a temporal engagement part for the spiral spring 74.

The spiral spring 74 is formed from a metal, and is held on the brush-holding metal plate 70 with the center of a spiral 74a hung on a distal (left) end of the spiral spring holder 84. The spiral 74a has its spiral axis extending in the right-left direction.

The spiral spring 74 has an arm 74b extending from a lower portion to an upper front portion of the spiral 74a. A front end of the arm 74b urges an upper surface of the brush 30 held on the brush-holding metal plate 70 downward. The spiral spring 74 in FIGS. 6A and 6B without showing the brush 30 is in the same state as in FIGS. 6C and 6D for clarity. However, the spiral spring 74 in FIGS. 6A and 6B can actually have the arm 74b lowered under the elastic force.

The brush 30 may be urged by another elastic member (brush-urging elastic member) such as a plate spring, in place of or in addition to the spiral spring 74.

The conductive metal plate 76 is formed by bending a single flat sheet metal. The conductive metal plate 76 includes a brush contact 76a and a terminal portion 76b. The brush contact 76a extends vertically and laterally, and receives the brush 30 in front. The terminal portion 76b extends rearward from the left of the brush contact 76a.

The brush contact 76a comes in contact with a rear surface of the brush 30, which is held in the case 82. Multiple (three) slots in the brush contact 76a each receive a corresponding protrusion 82a protruding rearward from the rear of the case 82. The conductive metal plate 76 is thus engaged with the brush-holding metal plate 70. The brush contact 76a has a downward recess 94 in the upper middle. The arm 74b is located above or in the recess 94. This structure avoids interference between the brush contact 76a and the arm 74b.

Figure 6C:
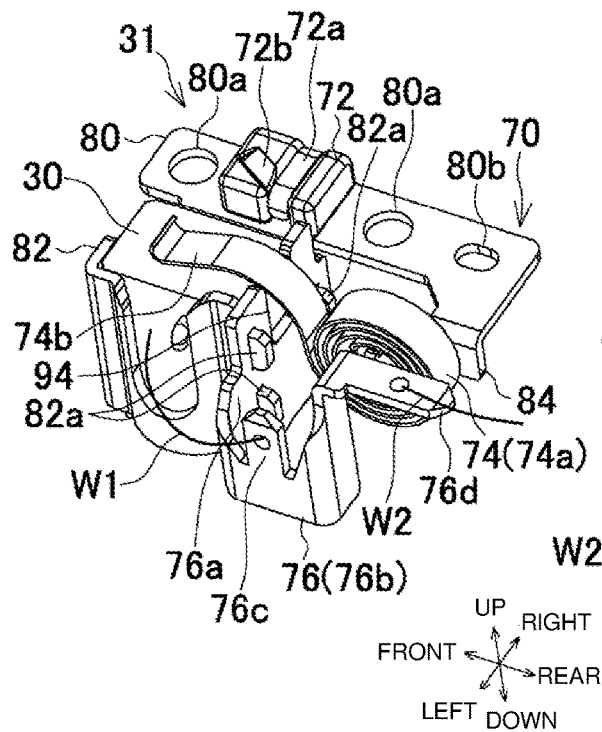
Figure 6D:
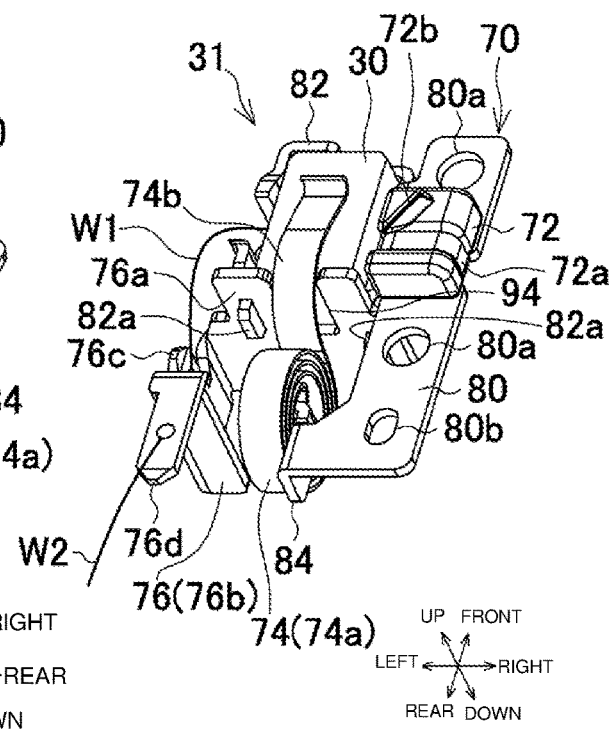

The terminal portion 76b has a terminal 76c protruding upward on its upper front. As shown in FIGS. 6C and 6D, a short power supply line W1 extends between the terminal 76c and the brush 30 to electrically connect the terminal portion 76b and the brush 30.

A rear end of the terminal portion 76b serves as a terminal 76d extending rearward. As shown in FIGS. 6C and 6D, a power supply line W2 extends between the terminal 76d and the controller C to electrically connect the terminal portion 76b and the controller C. The brush 30 and the controller C are also electrically connected with the power supply line W1.

The conductive metal plate 76 may be eliminated when the brush 30 is electrically connected in another manner, or for example, when a lead wire is connected to a terminal, such as the arm 74b, in contact with the brush 30. In this case, the conductive metal plate 76 can be simply disengaged from the protrusions 82a on the case 82, without being disconnected from the brush-holding metal plate 70.

When the brush 30 appears to have worn by at least a predetermined amount, the rear cover 10 is removed to replace the brush 30 with a new one.

Figure 7A:
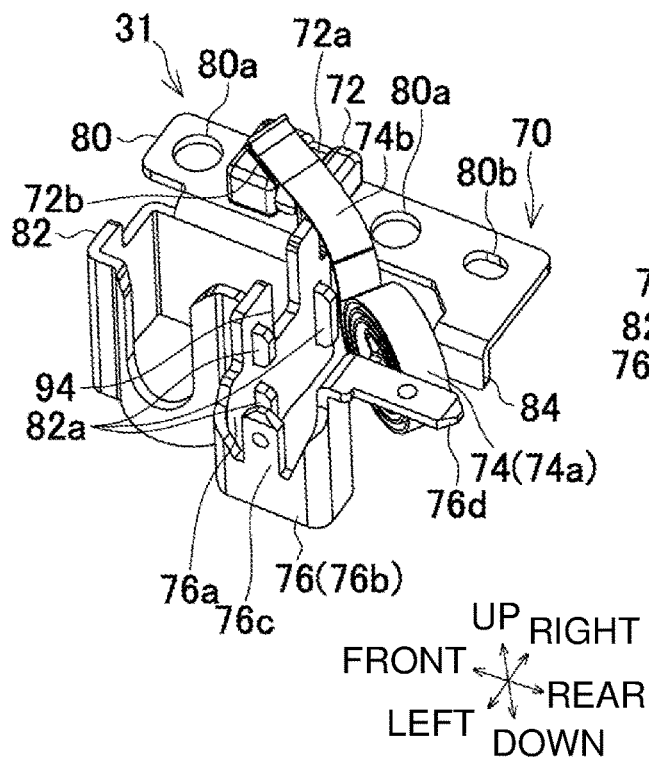
FIGS. 7A and 7B are perspective views of the brush holder in FIG. 5 with a spiral spring temporarily engaged.
Figure 7B:
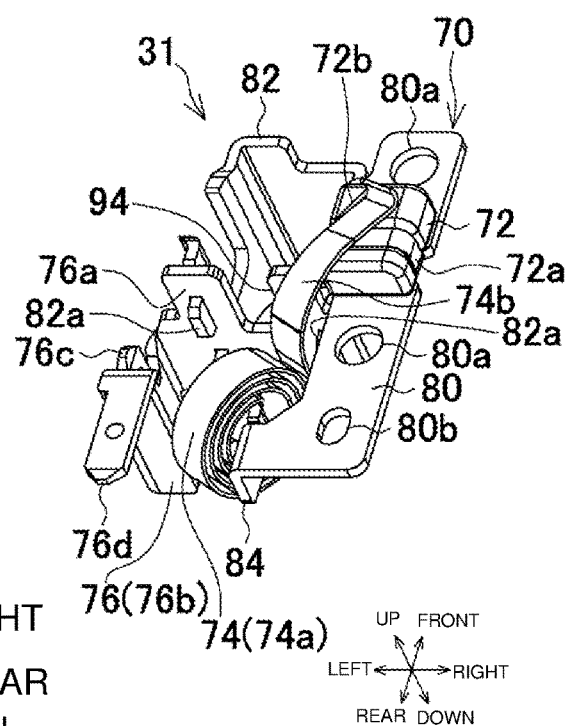

When a new brush 30 is placed in the brush holder 31 during replacement of the brush 30 or manufacturing of the grinder 1, the front end of the arm 74b is temporarily engaged with the groove 72b on the stopper 72 as shown in FIGS. 7A and 7B. The arm 74b is thus not obstructive when the brush 30 enters in the case 82, allowing the operator to easily place the brush 30 without holding the arm 74b with one hand and picking the brush 30 with the other hand. This facilitates the attachment and replacement of the brush 30. After the brush 30 is received in the case 82, a lower surface of the front end of the arm 74b temporarily engaged with the groove 72b easily returns in contact with the upper surface of the brush 30.

The grinder 1 according to the embodiment may operate in the manner described below.

The operator connects the electric power cable V to utility power (electrical outlet), pulls the standing locking member 54 down to the leaning state to release the lock, and presses the grip 52 upward. The interlocking member 53 is then elevated to press the plunger 32b by at least the predetermined pressing depth to turn on the switch 32 for the motor 18. Electric power is fed from the electric power cable V to the commutator 29 through the controller C, the conductive metal plate 76, and the brush 30 to rotate the motor shaft 20 in the rotor 25. The spindle 38 then rotates via the pinion 33 on the motor shaft 20 and the bevel gear 37 to rotate the grinding disc 46 mounted on the spindle 38. The operator presses the rotating grinding disc 46 against a workpiece for grinding the workpiece.

When the operator releases the grip 52, the grip 52 and the interlocking member 53 return downward to release the plunger 32b from the pressing by at least the predetermined pressing depth. The switch 32 for the motor 18 is then turned off to stop the rotation of the motor shaft 20, stopping the rotation of the bevel gear 37, the spindle 38, and the grinding disc 46. Under the force of the torsion spring, the locking member 54 returns to the standing state in which the pressing operation on the paddle switch 50 is locked.

The rotation of the motor shaft 20 rotates the fan 35 to produce air flow (blow) toward the air inlets 10a. The blow cools the internal components of the grinder 1 including the motor 18 and the controller C.

The brush 30 is held on a single brush-holding metal plate 70 including the case 82 for holding the brush 30 and the base 80 for being attached to the motor housing 12. This structure has less tolerance accumulation and less rattling than the known structure including separate metal plates, one attached to the housing and the other holding the brush, which are engaged with each other. The brush 30 can retain its proper designed position with respect to the commutator 29.

Although the brush 30 may wear on its contact surface to the commutator 29 over time spent on rotation of the motor shaft 20, the brush 30 is urged by the spiral spring 74 on its surface opposite to the commutator 29, and remains in contact with the commutator 29. The spiral spring 74 is held on a single brush-holding metal plate 70 including the spiral spring holder 84 for receiving the spiral spring 74 and the base 80 for being attached to the motor housing 12. Similarly to the brush 30, the spiral spring 74 can retain its proper design position.

Each pin hole 80b in the base 80 receives the corresponding pin 91 on the brush holder fixing member 12b. The brush-holding metal plate 70 thus more reliably retains its designed position with respect to the motor housing 12, allowing the brush 30 and the spiral spring 74 to more properly retain their positions.

The grinder 1 according to the embodiment includes the housing 6, the stator 24 fixed to the housing 6, the rotor 25 rotatable relative to the stator 24 and including the commutator 29 and the coils 28, the brush 30 that comes in contact with the commutator 29, the brush-holding metal plate 70 having the screw holes 80a and holding the brush 30, and the screws 92 directly fastened to the housing 6 (extension 12a on the motor housing 12) through the screw holes 80a. The single brush-holding metal plate 70 having the screw holes 80a for receiving the screws 92 holds the brush 30, allowing the brush 30 to be positioned more accurately with respect to the commutator 29.

Two screw holes 80a and two screws 92 are provided. This improves the positional accuracy of the brush-holding metal plate 70 during fixation, thus allowing the brush 30 to be positioned more accurately with respect to the commutator 29.

The grinder 1 according to the embodiment includes the housing 6, the stator 24 fixed to the housing 6, the rotor 25 rotatable relative to the stator 24 and including the commutator 29 and the coils 28, the brush 30 that comes in contact with the commutator 29, the spiral spring 74 that urges the brush 30 toward the commutator 29, and the brush-holding metal plate 70 holding the brush 30 and the spiral spring 74. The brush 30 and the spiral spring 74 urging the brush 30 toward the commutator 29 are fixed to the housing 6 with improved positional accuracy.

The grinder 1 includes the housing 6 directly including multiple pins 91, the stator 24 fixed to the housing 6, the rotor 25 rotatable relative to the stator 24 and including the commutator 29 and the coils 28, the brush 30 that comes in contact with the commutator 29, and the brush-holding metal plate 70 having the multiple pin holes 80b and holding the brush 30. The pins 91 are received in the pin holes 80b. The brush-holding metal plate 70 is thus fixed to the housing 6 with higher accuracy, allowing the brush 30 to be positioned accurately with respect to the commutator 29.

Multiple pins 91 and multiple pin holes 80b are provided. This improves the positional accuracy of the brush-holding metal plate 70 during fixation, thus allowing the brush 30 to be positioned more accurately with respect to the commutator 29.

The stopper 72 faces the pin 91 received in the pin hole 80b to restrict contact between the brush-holding metal plate 70 and other members. The stopper 72 for protecting other members from contact with the brush-holding metal plate 70 is compact.

The stopper 72 is formed from a heat-resistant resin. Thus, other members are protected from heat generated and transferred from the brush 30 to the brush-holding metal plate 70 when the brush 30 slides on the commutator 29.

The present invention is not limited to the above embodiments. For example, the above embodiments and modifications may be further modified appropriately as described below.

One pair or three or more pairs of screw holes 80a and screws 92 may be provided.

One pair or three or more pairs of pin holes 80b and pins 91 may be provided.

The pins 91 for fastening the brush-holding metal plate 70 may be fastened indirectly to the housing 6, or specifically fastened to another member held on the housing 6, such as a box. The housing 6 may indirectly include the pins 91 located on another member held on the housing 6, such as a box. In this case as well, the brush-holding metal plate 70 is positioned accurately with respect to the other member (fixing target).

The brush-holding metal plate 70 may include plate projections formed from small bent-pieces in place of the pin holes 80b, and the housing 6 may include housing holes for receiving the plate projections in place of the pins 91. The brush-holding metal plate 70 is fixed to the housing 6 with plate projections received in the housing holes. The plate projections and the housing holes may be provided in addition to the pin holes 80b and the pins 91.

In the paddle switch 50, the interlocking member 53 may be eliminated and the grip 52 may turn on and off the switch 32. The locking member 54 may be of another type, such as an electric locking switch, or may be eliminated. The fulcrum 56 in the grip 52 may be located at the rear end of the grip base 55, or may be supported by the rear cover 10. An additional elastic member for returning the paddle switch 50 to the lowermost position may be provided between the paddle switch 50 and the housing 6 or the motor 18.

At least any of the number of sections, the size, and the shape of the housing 6 may be modified variously. For example, at least either the rear cover 10 or the motor housing 12 may include right and left halves, or at least any of the motor housing 12, the gear housing 14, and the bearing retainer 16 may be used commonly.

The shapes or materials of the mechanisms, members, and parts, or the numbers of mechanisms, members, and parts may be modified appropriately. For example, the bearings may be of other types, the switch 32 for the motor 18 may change the rotation speed of the motor shaft 20 depending on the pressing depth of the plunger 32b (e.g., the motor shaft 20 rotates faster as the pressing depth is larger), one or more countershafts may be placed between the motor shaft 20 and the spindle 38, or the coils may be replaced with permanent magnets.

The present invention is applicable to another type of power tool, such as a battery-driven tool, a tool having the spindle 38 (output unit 4) and the motor shaft 20 parallel to each other, or a sander, to a cleaner or a blower, or to a gardening tool, such as a lawn mower or a gardening trimmer.

REFERENCE SIGNS LIST 1 grinder (power tool)
6 housing
18 motor
20 motor shaft
24 stator
25 rotor
28 coil
29 commutator
30 brush
31 brush holder
70 brush-holding metal plate
72 stopper (restrict member)
74 spiral spring (elastic member)
80a screw hole
80b pin hole (plate hole)
91 pin (housing projection)
92 screw.

What is claimed is:

1. A power tool, comprising:
   a housing;
   a stator fixed to the housing;
   a rotor rotatable relative to the stator, the rotor including a commutator and a coil;
   a brush configured to come in contact with the commutator;
   a brush-holding metal plate having a screw hole and holding the brush; and
   a screw extending through the screw hole and directly or indirectly fastened to the housing; and
   a conductive metal plate in contact with the brush, the conductive metal plate including
   a brush contact located behind the brush, and
   a terminal portion extending rearward from the brush contact.

2. The power tool according to claim 1, wherein
   the power tool includes a plurality of the screws, and
   the brush-holding metal plate has a plurality of the screw holes.

3. The power tool according to claim 2, further comprising:
   an elastic member configured to urge the brush toward the commutator.

4. The power tool according to claim 1, further comprising:
   an elastic member configured to urge the brush toward the commutator.

5. The power tool according to claim 1, wherein
the conductive metal plate includes the terminal portion electrically connected to the brush with a power supply line.
6. The power tool according to claim 1, wherein
the brush-holding metal plate includes a protrusion engaged with the conductive metal plate.
7. The power tool according to claim 1, wherein
the conductive metal plate has a recess, and
the elastic member includes an arm located above or in the recess.
8. The power tool according to claim 7, wherein
the restrict member has a groove engageable with the arm.
9. A power tool, comprising:
a housing;
a stator fixed to the housing;
a rotor rotatable relative to the stator, the rotor including a commutator and a coil;
a brush configured to come in contact with the commutator;
an elastic member configured to urge the brush toward the commutator;
a brush-holding metal plate holding the brush and the elastic member; and
a conductive metal plate in contact with the brush, the conductive metal plate including
a brush contact located behind the brush, and
a terminal portion extending rearward from the brush contact.
10. The power tool according to claim 9, wherein
the elastic member is a spiral spring.
11. A power tool, comprising:
a housing formed with a housing projection;
a stator fixed to the housing;
a rotor rotatable relative to the stator, the rotor including a commutator and a coil;
a brush configured to come in contact with the commutator; and
a brush-holding metal plate having a plate hole and holding the brush,
wherein the housing projection is received in the plate hole.
12. The power tool according to claim 11, wherein
the housing includes a plurality of the housing projections; and
the brush-holding metal plate has a plurality of the plate holes.
13. The power tool according to claim 12, wherein
the brush-holding metal plate includes a restrict member facing the housing projection received in the plate hole to restrict contact between the brush-holding metal plate and another member.
14. The power tool according to claim 12, further comprising:
an elastic member configured to urge the brush toward the commutator.
15. The power tool according to claim 11, wherein
the brush-holding metal plate includes a restrict member facing the housing projection received in the plate hole to restrict contact between the brush-holding metal plate and another member.
16. The power tool according to claim 15, wherein
the restrict member is made of a heat-resistant resin.
17. The power tool according to claim 11, further comprising:
an elastic member configured to urge the brush toward the commutator.
18. The power tool according to claim 11, further comprising:
a conductive metal plate in contact with the brush, the conductive metal plate including
a brush contact located behind the brush, and
a terminal portion extending rearward from the brush contact.
19. The power tool according to claim 11, wherein:
the housing has an outer shell; and
the housing projection is inside the outer shell.
20. The power tool according to claim 19, wherein:
the housing includes an inner member spaced from the outer shell; and
the housing projection is supported by the inner member.
21. The power tool according to claim 20, wherein:
the housing projection projects outwardly from the inner member toward the outer shell.
22. The power tool according to claim 21, wherein the brush-holding metal plate is between the inner member and the outer shell.

* * * * *